F. P. BECK.
DUPLEX REPRODUCER FOR PHONOGRAPHS.
APPLICATION FILED SEPT. 4, 1907.
950,428.
Patented Feb. 22, 1910.
2 SHEETS—SHEET 1.
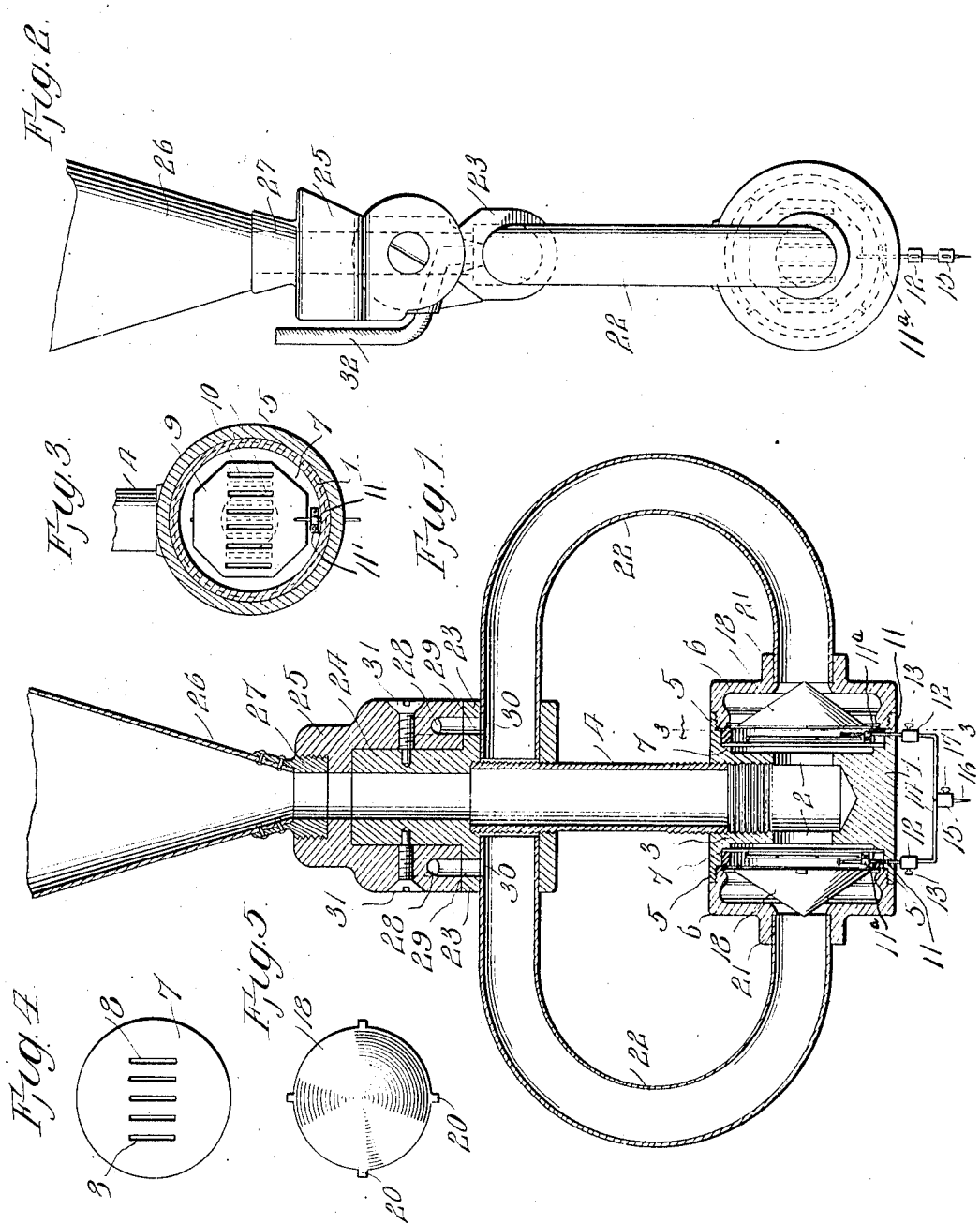

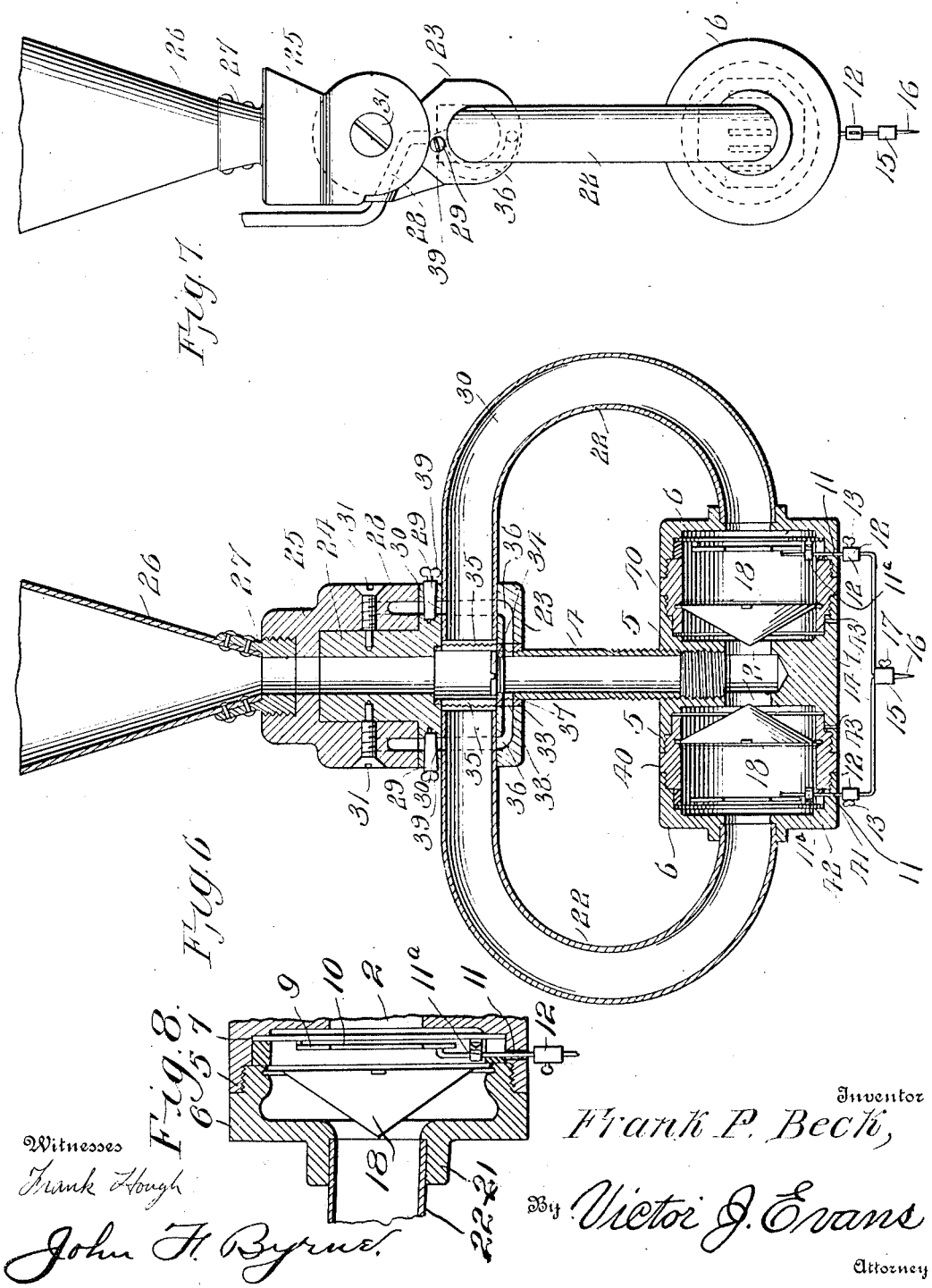

UNITED STATES PATENT OFFICE.

FRANK P. BECK, OF RICHMOND, VIRGINIA.

DUPLEX REPRODUCER FOR PHONOGRAPHS.

950,428.

Specification of Letters Patent.   Patented Feb. 22, 1910.

Application filed September 4, 1907. Serial No. 391,359.

*To all whom it may concern:*

Be it known that I, FRANK P. BECK, a citizen of the United States of America, residing at Richmond, in the county of Henrico and State of Virginia, have invented new and useful Improvements in Duplex Reproducers for Phonographs, of which the following is a specification.

This invention relates to duplex reproducers for phonographs, and one of the principal objects of the same is to provide means for conveying compressed air through the sound box and up into the outlet horn.

Another object of the invention is to provide a plurality of sound boxes, and means for conveying compressed air through the sound boxes and out through the horn, the purpose being to amplify the reproduction of sound records, and to do away with the ordinary diaphragm.

These and other objects may be attained by means of the construction illustrated in the accompanying drawing, in which:

Figure 1 is a central vertical section of a reproducer made in accordance with my invention. Fig. 2 is a side elevation of the same. Fig. 3 is a vertical section on the line 3—3, of Fig. 1, looking in the direction indicated by the arrow. Fig. 4 is a plan view of the stationary disk or diaphragm in the sound box. Fig. 5 is a plan view of the conical air deflector. Fig. 6 is a central vertical section of a modified form of the reproducer, and Fig. 7 is a side elevation of the same. Fig. 8 is a detail sectional view, illustrating the manner of mounting the wires 11 in the sound box.

Referring to the drawing for a more particular description of my invention, the numeral 1 designates the body portion of the sound box provided with openings 2 which communicate with an interiorly threaded portion 3 in which is adjustably fitted a tube 4. The body portion 1 is provided with interior screw threads 5 at the outer ends thereof, and fitted in the outer ends of said body portion 1, are the outer members 6 of the sound boxes. Fitted between the members 1 and 6 of the sound box at opposite sides thereof are port plates 7 provided with a series of vertical slots 8, said plates being clamped between said two members 1 and 6, as shown in Fig. 1. A vibratory disk 9 also provided with slots 10 which are disposed out of alinement with the slots 8, as shown more particularly in Fig. 3, is secured one upon each side of the sound box at the side of the disk 7, said vibratory disk being supported upon a wire 11, and said wires 11 passing through openings in the box of sufficient size to permit the disk to vibrate, said wires being adjustably connected to a clamp 12 provided with a set screw 13. The wires 11 pass through keepers 11ᵃ secured to the sound box body. Also connected to the clamp 12 is a cross bar 14, said cross bar having a needle holder 15 centrally disposed thereon to receive a stylus or needle 16 which is held in place by means of a set screw 17. Thin sheet metal air deflectors 18 of conical formation and provided with peripheral lugs 20, are secured to the members 6 by means of the lugs 20, and the space between the lugs 20 and the periphery of the deflector 18 forms inlet openings for the passage of the compressed air. Fitted to bosses 21 on the box members 6 are curved air tubes 22, the upper ends of which are fitted in a nipple 23 projecting at opposite sides of a hollow boss 24 in which is adjustably fitted the tube 4 between the ends of the pipes 22. Hinged to the boss 24 is a horn support 25 to which a horn 26 is suitably fitted, as by a threaded nipple 27. The horn support 25 is provided with air passage 28 which communicate with openings 29 in the nipple 23 and the air pipes 22 are provided with openings 30 which communicate with the air passages. The horn support 25 is pivoted upon the screws 31 which pass through the horn support and have their inner ends disposed upon opposite sides of the boss 24. Flexible air pipes 32 communicate with the air passages 28 and said air pipes 32 are connected to some suitable source of compressed air.

The operation of my invention may be briefly described as follows: When the stylus 16 is placed upon a record and the record revolved, compressed air is forced through the tube 32 and through the air pipes 22 against the deflectors 18, the air being carried up and around the periphery of said deflectors into the sound box and the vibrating disk 9 is moved by the movement of the stylus and also by the air which passes through the same and through the stationary port plates 7, the air thus conveying the sound up through the tube 4 and out through the horn 26.

In Figs. 6 and 7 of the drawings, I have illustrated a reproducer including a structure which will permit the sound to be conveyed through the tube 4 or through the tubes 22, as the operator may elect. In this construction of the reproducer, the upper end of the tube 4 has threaded engagement with a sleeve 33 mounted in the nipple 23, and is threaded for the reception of a plug 34. The sleeve 33 is provided with openings 35, and the sleeve is so mounted that it may be turned to register said openings with the ends of the tubes or throw them out of registration therewith. The nipple 23 is provided with air passages 36 which communicate with the air passages 28 adjacent the openings 29 and with the tube 4 below the plug 34 through the medium of openings 37 in the tube 5 and openings 38 in the sleeve 33. It should be observed that when the openings 35 register with the ends of the tubes 22, the openings 38 register with the openings 33 and air passages 36, and that when the openings 35 are out of registration with the ends of the tubes 22 communication between the passages 36 and tube 4 is cut off. Valves 39 are mounted in the nipple 23 at the intersections of the passages 36 and openings 29 and provided with means by which air may be directed through the openings 29 into the tubes 22 or through the passages 36 into the tube 4. The outer members 6 of the sound box are adapted to be connected to the body portion thereof by means of coupling members 40, which carry the air deflectors 18 and between which and the members 6 or the body portion 1, the diaphragms 7 are mounted. When it is desired to convey the sound through the tubes 22, the sleeve 33 is turned so that the openings 35 and 38 therein will register with the ends of the tubes 22 and with the passages 36 and openings 37 in the tube 4, thereby establishing communication between the horn 26 and the tubes 22 and between the air passages 28 and the tube 4. The deflectors 18 are arranged in opposition to the openings 2, and the diaphragms 7 are secured between the couplings 40 and the outer members 6 of the sound boxes. As vibrator disks 9 must be located between the deflectors 18 and the diaphragms 7, a longer cross bar 14 is used, and the wires 11 connected thereto are passed through the openings 41 in the outer members 6 and the openings 42 in the couplings 40. With the parts arranged in this manner and the valves 29 opened to permit the air to pass from the passages 28 to the passages 36, the air may be directed to the tube 4 against the deflectors 18 and around the same into the sound boxes, then through the diaphragms 7 and 9 to the tubes 22 and thence out through the horn 26. When it is desired to convey the sound through the tube 4 to the horn 26, the valves 29 are turned to cut off communication between the air passages 28 and 36; the plug 35 removed; the sleeve 33 turned so that the openings 35 and 38 will be out of registration with the tubes 22 and 4; the couplings 40 registered so that the deflectors 18 will be in opposition to the ends of the tubes 22, and the diaphragms 7 secured between the body portion 1 and the couplings. With the parts in this position, it is necessary to use a shorter cross bar 14 and the wires 11 connected to the diaphragms 9, passed through the openings 43 and the openings 42 and the coupling members 40.

From the foregoing it will be obvious that either one or the other of the sound boxes may be cut out by passing compressed air through one only of the pipes 32, that any suitable number of sound boxes may be used and that the record is very much amplified owing to the number of sound boxes and the manner of forcing compressed air through the same and out through the outlet horn.

From the foregoing description taken in connection with the accompanying drawings, the construction and mode of operation of the invention should be understood without a further extended description.

Changes in the form, proportions and minor details of construction may be made within the scope of the claims without departing from the spirit or sacrificing any of the advantages of the invention.

Having thus described the invention, what I claim is:—

1. A sound reproducer comprising a plurality of sound boxes, deflectors in said boxes, curved air pipes connected to said boxes at one end, a hinged horn support, oppositely disposed nipples to which said air pipes are connected, and an adjustable tube connecting the sound box with said nipples.

2. A sound reproducer comprising a sound box, a coupling member secured to the sound box, a deflector secured to the coupling member, the outer member of the sound box being secured to the coupling member, a stationary port plate secured between the coupling member and the sound box, said port plate being provided with slots, a movable slotted diaphragm mounted between the deflector and the stationary port plate, a stylus connected to the movable diaphragm, a tube communicating with the sound box, another tube communicating with the outer member of the sound box, and means for conveying air through one or the other of said tubes.

3. A sound reproducer including a sound box, a deflector, a diaphragm, a stylus connected to the diaphragm, tubes connected to the sound box, and means for directing air through one or the other of said tubes.

4. A sound reproducer including a sound box, a deflector, a diaphragm, a stylus connected to the diaphragm, tubes connected to the sound box, a nipple connecting the tubes at their opposite ends, a horn carried by the nipple, a removable plug carried by one of the tubes, a sleeve carried by the nipple and adapted to cut off communication between the horn and one of the tubes, and means by which air may be conveyed through one or the other of said tubes to the sound box.

In testimony whereof I affix my signature in presence of two witnesses.

FRANK P. BECK.

Witnesses:
 BEN BERGMANN,
 GEO. C. WILES.